May 21, 1968  J. L. HUITT  3,384,176
METHOD OF FRACTURING USING DENSE LIQUID TO
DIRECT PROPPING AGENT INTO THE FRACTURE
Filed Oct. 3, 1966
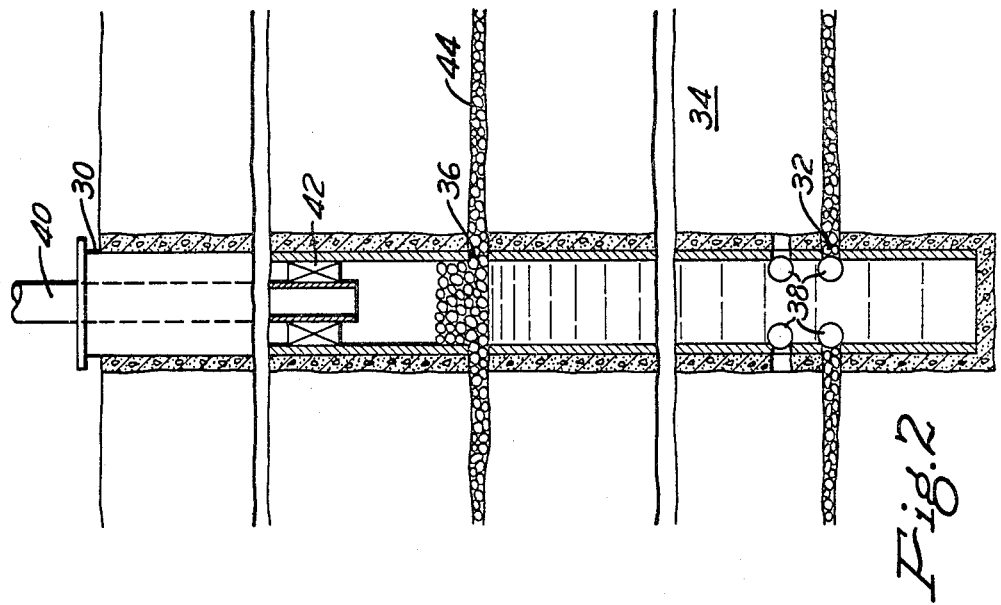
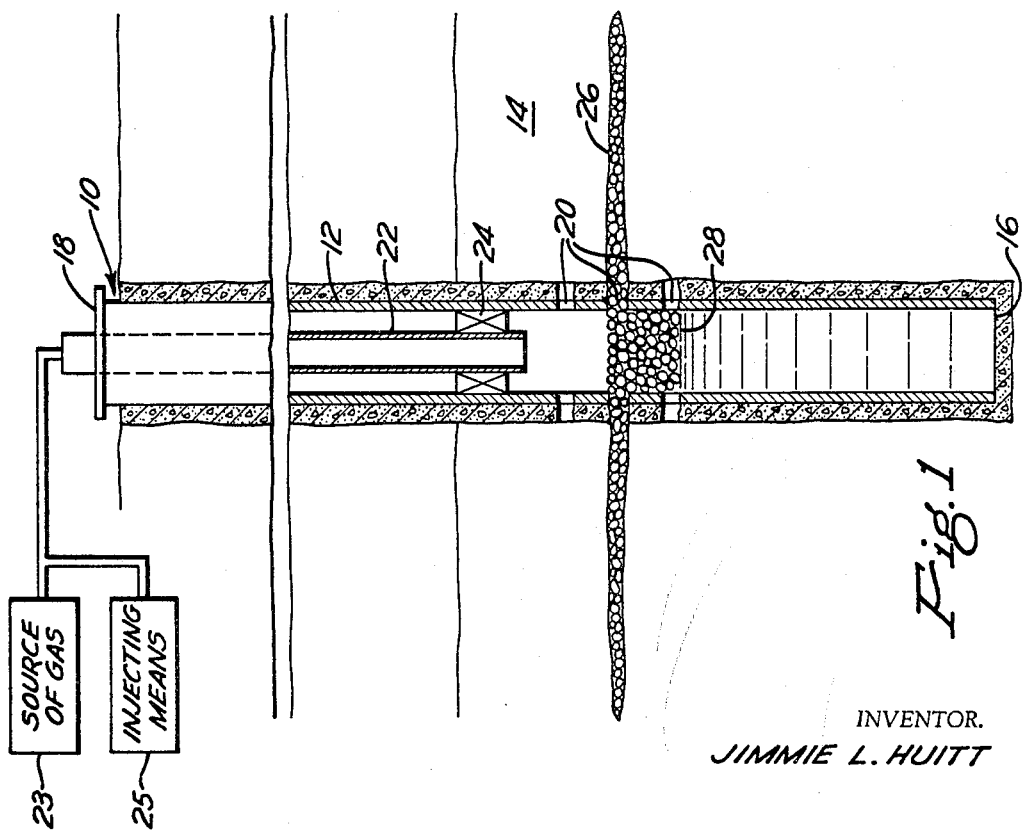
INVENTOR.
JIMMIE L. HUITT United States Patent Office 3,384,176
Patented May 21, 1968

3,384,176
METHOD OF FRACTURING USING DENSE
LIQUID TO DIRECT PROPPING AGENT
INTO THE FRACTURE
Jimmie L. Huitt, Glenshaw, Pa., assignor to Gulf Research
& Development Company, Pittsburgh, Pa., a corporation of Delaware
Filed Oct. 3, 1966, Ser. No. 583,581
4 Claims. (Cl. 166—42)

This invention relates to a method for the stimulation of wells and more partcularly to an improved method for propping a fracture extending from a well into a surrounding subterranean formation.

One of the most important developments in the technology of production of oil or gas during the past decade has been the hydraulic fracturing process. In that process a fluid is displaced down a well into contact with the fluid-containing formation at a rate higher than the fluid can flow through the passages originally in the formation. On continued displacement of the fluid down the well, the pressure within the well increases to a pressure at which the formation breaks down to form one or more fractures extending outwardly from the well to the formation. Solid granular particles of propping agents suspended in a suitable fluid are then displaced down the well and into the fractures to hold the faces of the fracture apart and thereby provide a high-capacity flow conduit from the formation into the well.

An important part of the cost of fracturing jobs using liquids to transport propping agents into the fracture is rental of high-pressure pumps capable of pumping the liquid at a high rate to transport the propping agent into the outer part of the fracture. To avoid the high pump rental charges, gases, particularly nitrogen delivered to the well site as a liquid and converted to the gaseous state after pumping to the pressure required, have been used to transport the propping agent.

When gas is used to transport the propping agent, one of the problems encountered is transporting the propping agent into the fracture. As the gas reaches the level of the fracture and changes direction to enter the fracture, the propping agent tends to continue down the well. One method that has been suggested for directing the propping agent into the fracture is to set a plug in the well immediately below the level of the fracture. Setting a plug is a relatively expensive time-consuming operation which increases the cost of the fracturing operation. It has also been suggested that the gas in which the propping agent is suspended be delivered down tubing having an L at its lower end to discharge the propping agent into the fracture. Ordinarily casing is set through the formation that is to be fractured and the casing is perforated to provide access to the fracture. Setting tubing in position to line up the outlet of the L with the perforations is extremely difficult and unless proper alignment is obtained the L is substantially ineffective.

This invention resides in a method for fracturing formations having casing set through the formation and openings in the casing at the desired level of fractures in which the casing is filled to at least the level of the opening with a liquid having a density higher than the density of the propping agent that is used to prop the fracture open. Thereafter, a fluid is displaced down the well at a rate causing breakdown of the formation and a gas having a propping agent suspended therein is displaced down the well and into the resultant fracture.

In the drawings:
FIGURE 1 is a diagrammatic view, partially in vertical section, of a well fractured by the method of this invention.
FIGURE 2 is a diagrammatic view, also partially in vertical section, of a well in which the method of this invention is used to create multiple fractures extending from the well.

In the method of this invention, the borehole of the well below the level of the desired fracture is filled with a liquid having a density higher than the density of the propping agent. Liquids of suitable densities can be obtained, for example, by dissolving salts in water. The necessary density of the liquid will depend upon the particular propping agent used. If a propping agent of low density such as rounded nutshells, which have a particle density of approximately 1.2 grams per cubic centimeter, is used, it is only necessary that the liquid used to fill the bottom of the bore hole have a density slightly higher than 1.2 grams per cubic centimeter. Aqueous solutions of sodium chloride are suitable to provide densities up to approximately 1.2 grams per cubic centimeter, and aqueous solutions of calcium chloride are suitable for densities up to approximately 1.4 grams per cubic centimeter.

If the propping agent has a higher density, such as a particle density of 1.5 grams per cubic centimeter or more, other inorganic compounds can be dissolved in water to produce a liquid of the necessary density. For example, potassium hydroxide and sodium hydroxide can be used for densities up to about 1.5 grams per cubic centimeter. Aqueous solutions having a density as high as about 1.9 grams per cubic centimeter can be prepared by dissolving zinc chloride in water. Substantially spherical particles of glass or slag having adequate strength to permit their use as propping agents and having a particle density between 1.5 and 1.8 can be manufactured. Aqueous solutions of zinc chloride having densities higher than such propping agents can be used in this invention. High density organic chemicals such as chlorinated hydrocarbons having densities in the range of 1.6–1.7 grams per cubic centimeter are available. For propping agents of higher density, liquids, such as tetrabromomethane diluted with benzene and thallium formate diluted with water, can be used to give a density exceeding 2.75.

Referring to FIGURE 1 of the drawings, a well indicated generally by reference numeral 10 is illustrated having casing 12 extending downwardly through an underground formation 14 to a total depth 16. The casing is cemented in place in accordance with conventional practice. The upper end of casing 12 is closed by a suitable cap 18. An opening in the casing is provided at the level of the desired fracture to allow pressure of the fracturing fluid to be applied to the formation. In FIGURE 1, casing 18 is shown with perforations 20 at the desired level of the fracture in formation 14. A circumferential notch can be used in place of the perforations. Tubing 22 having a packer 24 on its lower end is run into the well until the lower end of tubing 22 is at a level just above total depth 16. A volume of liquid having a density higher than the density of the propping agent that is to be used is displaced into tubing 22. The volume of high-density liquid is such that when tubing 22 is raised until its lowermost end is above the level of the high-density liquid, the level of the high-density liquid is slightly above the uppermost perforation 20. Packer 24 is then set at a level such that the lower end of tubing 22 is about five feet above the uppermost perforation 20. A fracturing fluid is then displaced down tubing 22 at a rate causing an increase in pressure to break down the formation 14 and initiate fracture 26, at which time that portion of the high-density liquid in the well bore above the level of fracture 26 is displaced into the fracture 26. The initiation of the fracture is usually indicated by a drop in the pressure in the well.

The fracturing fluid can be either a liquid or a gas. In a preferred method a small volume such as 2 to 5 barrels of a low-penetrating liquid is displaced down the well behind the high-density liquid. The upper end of tubing 22 is connected with a source 23 of gas under high pressure. Source 23 may be, for example, a tank truck for liquid nitrogen equipped with a pump capable of delivering a pressure of 10,000 p.s.i. and an evaporator for converting the high-pressure liquid to the gaseous state. Suitable means 25 are provided for injecting the propping agent into the high-pressure gas before the gas enters tubing 22. Injection means 25 may be a pair of pressure vessels from which the propping agent is injected into the gas from source 23.

The gas having the propping agent suspended in it is then displaced down the well to extend the fracture for the desired distance and deposit the propping agent in the fracture. The initial propping agent that attempts to continue a downward movement toward total depth 16, rather than enter fracture 26, strikes the high-density liquid. Because the propping agent is of lower density than the high-density liquid, the propping agent floats to form a thin bridge of propping agent 28 at the surface of the high-density liquid. Subsequent propping agent that attempts to continue a downward movement, rather than enter fracture 26, strikes the propping agent bridge 28 and is swept into fracture 26 by the carrying fluid, thereby keeping the propping agent not utilized in propping fracture 26 to a minimum.

After the completion of the fracturing operation, the well is shut in for a time sufficient to permit the fracture to close such that the overburden rests on the propping agent particles. The high-density liquid and the propping agent remaining in the well bore are removed in the conventional manner of cleaning out a well bore below a perforated zone.

In the embodiments of the invention illustrated in FIGURE 2, casing 30 is perforated at 32 and a fracture made to extend into the surrounding formation 34 in the manner described for the embodiment of the invention illustrated in FIGURE 1. Thereafter, the casing 30 is perforated at an upper level 36 at which an additional fracture is desired. After the perforations are made at 36, the ball sealers 38 are displaced into the well to plug the perforations 32. While maintaining pressure on the well to hold the ball sealers 38 in place, the well is then filled at least to the level of perforations 36 with a high-density liquid. Thereafter tubing 40 and packer 42 are run into the well and an upper fracture 44 is created and propped with propping agents transported in gas in the manner described for the embodiment of the invention illustrated in FIGURE 1.

By suitable selection of the liquid used to fill the borehole to the level of the fracture, deposition of propping agents having a density of 3.0 grams per cubic centimeter or even higher can be prevented. This invention is particularly useful to direct propping agents having a density in excess of 1.2 grams per cubic centimeter and transported by gas into a fracture. The high densities of liquids available for use in this invention will float widely used conventional propping agents such as rounded nutshells, sand, aluminum spheres, and glass beads. The invention is particularly useful in directing glass spheres having a low particle density in the range of 1.5 to 1.6 grams per cubic centimeter into a fracture. A gas can transport such spheres through the fracture more readily than other commonly used propping agents.

This invention does not impose any limitation on the size of the propping agent particles because large as well as small particles will float in the dense liquid. The size of the propping agent particles will be determined by the usual considerations. Particles having a size in the range of 4 to 40 mesh, or still more desirably 12 to 20 mesh or 8 to 12 mesh particles are available. Because the propping agent particles do not have to be passed through a pump, even larger particles can be used.

I claim:

1. A method of increasing the productivity of a well having casing extending downwardly into a fluid-bearing formation comprising cutting an opening in the casing at the level of the desired fracture to provide communication with the fluid-bearing formation, filling the casing at least to the level of the opening with a liquid having a density higher than the density of a propping agent to be used to prop the fracture open, initiating a fracture in the formation through the opening, displacing a gas with the propping agent suspended therein downwardly in the well and outwardly into the fracture, and reducing the pressure within the well to deposit the propping agent within the fracture.

2. A method as set forth in claim 1 in which the propping agent has a density in the range of 1.1 to about 3 grams per cubic centimeter.

3. A method as set forth in claim 1 in which a low-penetrating liquid is displaced downwardly into the well at a rate to increase the pressure in the well and break down the formation to initiate the fracture.

4. A method of making multiple fractures extending from a well having casing set therein into the surrounding formation and propping the fractures open with a propping agent comprising perforating the casing at the level of a lower fracture, filling the casing to at least the level of the perforations with a liquid having a density higher than the density of the propping agent, displacing a fluid down the well at a rate to break down the formation and create a fracture extending from the well into the surrounding formation, displacing a gas having particles of propping agent suspended therein down the well and into the fracture, perforating the casing above the level of the fracture at the desired location of a second fracture, displacing sealers suspended in a liquid down the well to close the perforations at the level of the fracture, maintaining pressure on the well, filling the well at least to the level of the upper perforations with a liquid having a density higher than the density of the propping agent, displacing a fluid down the well at a rate to increase the pressure therein and break down the formation adjacent the upper perforations, and displacing a gas with propping agent suspended therein down the well and into the upper fracture.

References Cited

UNITED STATES PATENTS

| | | | |
|---|---|---|---|
| 2,223,397 | 12/1940 | White et al. | 166—13 |
| 2,693,854 | 11/1954 | Abendroth | 166—42.1 X |
| 3,028,914 | 4/1962 | Flickinger | 166—42.1 |
| 3,161,235 | 12/1964 | Carr | 166—42.1 X |
| 3,167,124 | 1/1965 | Graham | 166—42.1 |
| 3,170,517 | 2/1965 | Graham et al. | 166—42.1 |
| 3,331,206 | 7/1967 | Osborne | 166—42.1 X |

OTHER REFERENCES

Fast, C. R., Multiple Fractures Can Increase Recovery in Hydraulic Fracturing, Tulsa, Okla., Oil & Gas Journal Pub. Co., 1954, pp. 13–15.

CHARLES E. O'CONNELL, *Primary Examiner.*

I. A. CALVERT, *Assistant Examiner.*